(12) United States Patent
Burrell et al.

(10) Patent No.: US 7,249,070 B1
(45) Date of Patent: Jul. 24, 2007

(54) CENTRAL INVENTORY RECORD RECONCILIATION

(75) Inventors: Jeffery O. Burrell, Decatur, GA (US); Christopher H. Hymel, Birmingham, AL (US); Andy T. Ewing, Atlanta, GA (US); Susan H. Menkhaus, Alpharetta, GA (US); Carol A. Brechtel, Baton Rouge, LA (US)

(73) Assignee: AT&T Intellectual Property, Inc., Atlanta, GA (US)

( * ) Notice: Subject to any disclaimer, the term of this patent is extended or adjusted under 35 U.S.C. 154(b) by 762 days.

(21) Appl. No.: 10/017,311

(22) Filed: Oct. 30, 2001

(51) Int. Cl.
*G06Q 90/00* (2006.01)

(52) U.S. Cl. ..................................... 705/28

(58) Field of Classification Search .............. 705/28, 705/29, 30, 35, 36
See application file for complete search history.

(56) References Cited

U.S. PATENT DOCUMENTS

| | | | |
|---|---|---|---|
| 5,101,352 A * | 3/1992 | Rembert | 705/8 |
| 5,319,544 A * | 6/1994 | Schmerer et al. | 705/28 |
| 5,400,253 A * | 3/1995 | O'Connor | 701/123 |
| 5,936,860 A * | 8/1999 | Arnold et al. | 700/95 |
| 5,978,771 A * | 11/1999 | Vandivier, III | 705/8 |
| 6,430,536 B2 * | 8/2002 | Irving et al. | 705/2 |
| 6,601,764 B1 * | 8/2003 | Goodwin, III | 235/385 |
| 2002/0069103 A1 * | 6/2002 | Puri et al. | 705/11 |

OTHER PUBLICATIONS

Robison, "Inventory Profile Analysis: An Aggregation Technique for Improving Customer Service While Reducing Inventory," Second Quarter, 2001, *Production and Inventory Management Journal*.*

U.S. Appl. No. 09/964,973 entitled Inventory Record Reconciliation.

U.S. Official Action dated Feb. 4, 2005 in U.S. Appl. No. 09/964,973.

U.S. Official Action dated Jul. 13, 2005 in U.S. Appl. No. 09/964,973.

U.S. Official Action dated May 31, 2006 in U.S. Appl. No. 09/964,973.

U.S. Final Official Action dated Dec. 7, 2006 in U.S. Appl. No. 09/964,973.

* cited by examiner

*Primary Examiner*—Gerald J. O'Connor
(74) *Attorney, Agent, or Firm*—Merchant & Gould, LLC

(57) ABSTRACT

A system for reconciling a central inventory record having a count of products and location assignments for the instances of the count chooses instances for write-ons and write-offs based on the location assignments. When instances are to be written-on to the inventory record due to a shortage of instances in the record, then the added instances are assigned a location by detecting a shortage of instances for a particular location assignment relative to a proportionate amount and providing that location assignment to one or more of the added instances. When instances are to be written-off from the inventory record due to an excess number of instances in the record, the instances are removed by detecting excessive instances for a particular location assignment relative to a proportionate amount and removing one or more instances having that particular location assignment.

7 Claims, 8 Drawing Sheets

300

| 302 PRODUCT TYPE | 304 PRICE | 306 VINTAGE |
|---|---|---|
| PRODUCT A | $142 | 1995 |
| PRODUCT B | $171 | 1996 |
| ⋮ | ⋮ | ⋮ |
| PRODUCT Y | $148 | 1995 |
| PRODUCT Z | $ 93 | 1993 |

| 402 PRODUCT TYPE | 404 SUBSTITUTIONS |
|---|---|
| PRODUCT A | PRODUCT B, PRODUCT D |
| PRODUCT B | PRODUCT A, PRODUCT D |
| ⋮ | ⋮ |
| PRODUCT Y | PRODUCT O |
| PRODUCT Z | PRODUCT M |

FIG.4

| 502 ↘ IN-SERVICE PRODUCT TYPE | REDUCTIONS 504 | ADDITIONS 506 |
|---|---|---|
| PRODUCT A ($142, 1995) | 2 | – |
| PRODUCT B ($171, 1996) | – | 3 |
| ⋮ | ⋮ | ⋮ |
| PRODUCT Y ($148, 1995) | – | – |
| PRODUCT Z ($93, 1993) | – | 1 |

| 504 ↘ RE-USE PRODUCT TYPE | REDUCTIONS 508 |
|---|---|
| PRODUCT A | 4 |
| ⋮ | ⋮ |
| PRODUCT Z | 2 |

| 506 ↘ NEW PRODUCT TYPE | REDUCTIONS 510 |
|---|---|
| PRODUCT A | 1 |
| ⋮ | ⋮ |
| PRODUCT Z | 0 |

FIG.5

CENTRAL INVENTORY RECORD RECONCILIATION

TECHNICAL FIELD

The present invention is related to central inventory records that maintain a count and location assignment for particular items in inventory. More particularly, the present invention is related to reconciling central inventory records to provide a more accurate representation of the particular items in inventory.

BACKGROUND

Products maintained by an entity are generally tracked through inventory records. The inventory records maintain a count of each type of product in inventory. For a centralized inventory system that tracks products that will ultimately be distributed to various field inventory sites or in-service field locations, a location assignment is maintained in the inventory record for each instance of the count for each product type. The count and location assignment permits an entity to maintain a sufficient number of items in central inventory for a particular field location that is supplied by the central inventory.

The price each product costs when purchased and its vintage, or year of purchase, may be tracked in the inventory record as well. Tracking the price and vintage is useful for accounting purposes, such as scheduling depreciation of the items in inventory. Additionally, items in inventory may be grouped according to the count of items having a particular status, such as one count for the new items, another count for the items that are in inventory but have been used in the field and will be reused when needed, and items that are currently in-service at a field inventory site or service location.

For reasons such as maintaining an adequate inventory for each location and for properly accounting for the items in inventory, it is important to maintain an accurate inventory record as a part of an entity's bookkeeping practices. However, items in inventory are constantly in flux, so inventory records must be frequently updated. For example, items in inventory may be maintained in a central warehouse, maintained in a field warehouse at a location assignment, used in the field at the location assignment, and/or discarded. A periodic recount of the inventory is performed and is compared to the inventory record to reconcile any changes in the inventory with the count of the inventory record.

Often, the comparison of the recount to the count of the central inventory record results in items being found in inventory that are not accounted for by the count of the central inventory record. This situation requires a write-on, or an instance of a product being added to the count of the central inventory record. When a write-on occurs in the central inventory record, a location assignment must be provided for each instance being added to the count. If price and vintage are being tracked in the central inventory record, then a price and vintage must also be assigned for each instance being added.

At other times, the comparison may result in more instances of the count in the central inventory record than there are items in inventory. This situation requires a write-off, or an instance of a product being deleted from the count of the central inventory record. When a write-off occurs in the central inventory record, an instance to be removed must be chosen from the set of instances having various location assignments.

In many cases, items in inventory have no serialization. Therefore, there is no way to know whether a particular location assignment belongs to a particular item and there may be no way to know the price and vintage information for the item. The conventional practice to provide the price and vintage information for write-ons has been to assign an arbitrary price and vintage by finding the earliest vintage and its corresponding price in the inventory record and assigning this earliest vintage. This conventional approach is flawed because the earliest vintage is not an accurate representation for all write-ons and the location assignment for the write-ons remains unresolved. Similarly, for write-offs, the location assignment for an instance to be deleted form the record is arbitrarily chosen, and disproportionate location assignments for a product may result.

Therefore, there is a need for a central inventory reconciliation system that addresses these central inventory reconciliation problems including resolving the location assignment issues for write-ons and write-offs.

SUMMARY

Embodiments of the present invention address the problems discussed above and others by reconciling a central inventory record through providing a specific location assignment for write-ons and by choosing a specific location assignment for write-offs. The location assignment to be provided for a write-on is found by detecting a shortage of instances of the count for a product type for a particular location assignment relative to a proportionate amount. Similarly, the instances of the count are chosen for a write-off by detecting excessive instances of the count for a product type for a particular location assignment relative to a proportionate amount. The proportionate amount may be based on a known percentage of instances for a product type that should be assigned to a particular location, or it may be based on an equalization of instances for a product type across the location assignments.

In determining whether to write-on or write-off instances of the count, a recount of the inventory is generated to produce a raw number of items in inventory that can be compared to the count in the central inventory record. The count in the inventory record may be broken into several categories of status, including new items, re-used items, and in-service items. The recount may also be broken into these same categories such that embodiments of the present invention reconcile each category.

In addition to adding or removing instances based on the location assignments for the instances being considered, other quantities may be maintained in the inventory record such as pricing and vintaging for the product types. Embodiments of the present invention may also determine the price and vintage to assign write-ons. This determination may involve statistically determining a representative price and vintage, such as an average taken after instances with outlier values have been removed from the inventory record.

The various aspects of the present invention may be more clearly understood and appreciated from a review of the following detailed description of the disclosed embodiments and by reference to the drawings and claims.

DESCRIPTION OF THE DRAWINGS

FIG. 3 is an example of a price and vintage table used to assign a representative price and vintage for instances written-on to the inventory record.

FIG. 4 is an example of a substitution table used when reconciling the inventory record.

FIG. 5 is an example of a report summarizing write-ons and write-offs produced as a result of the inventory reconciliation.

DETAILED DESCRIPTION

Figure 1:
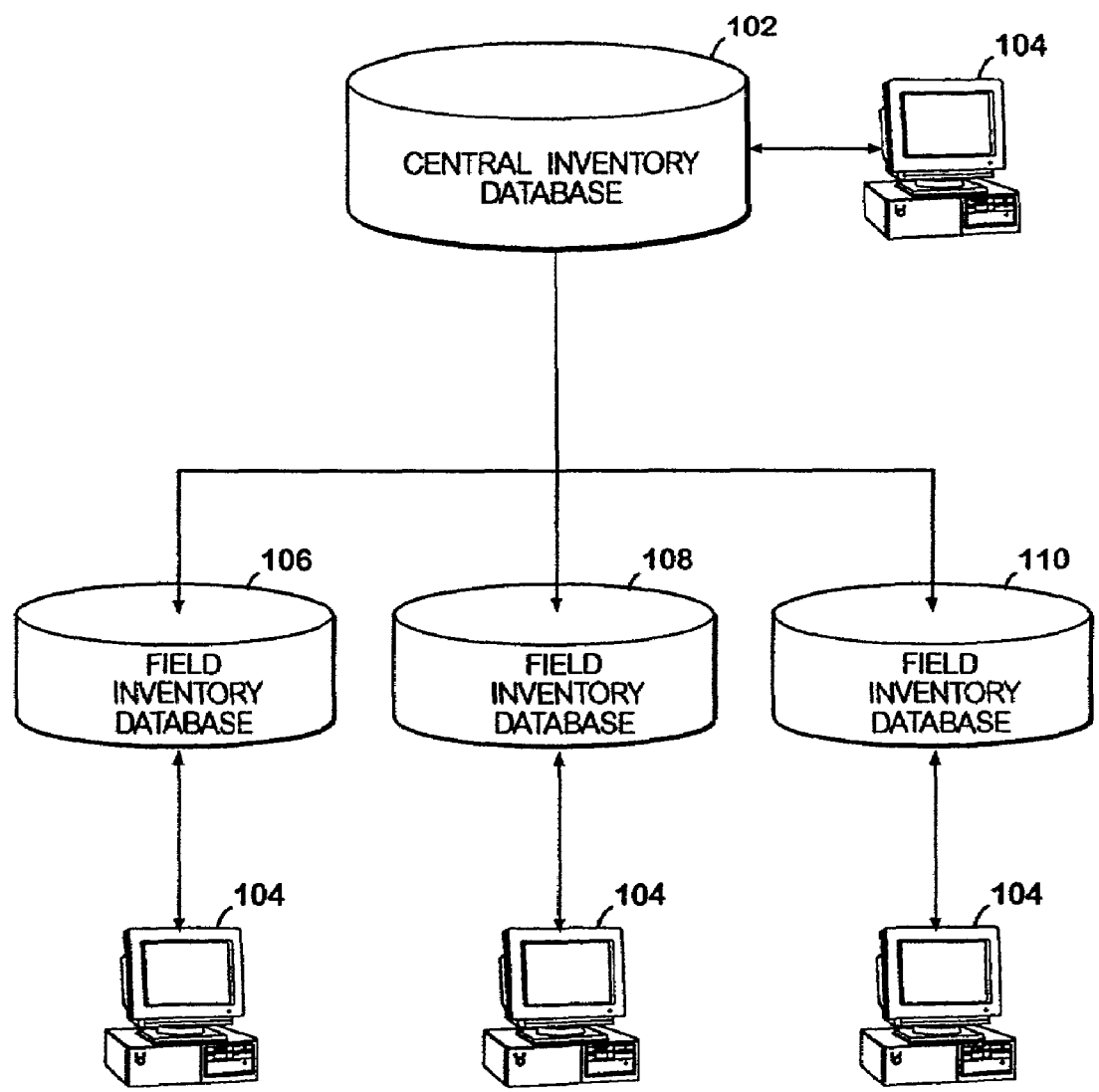
FIG. 1 depicts an example of an inventory system having a central inventory and field inventories.

A distributed inventory environment 100 is shown in FIG. 1. The distributed inventory environment 100 includes a central inventory database 102 and multiple field inventory databases 106, 108, and 110. The databases 102, 106, 108, and 110 are accessible through terminals 104, such as general-purpose computer systems interconnected with the databases through a local area network (LAN) and/or wide area network (WAN). A mainframe computer server that communicates with the terminals 104 generally maintains the databases.

Embodiments of the present invention may be applied to distributed inventory environments as shown in FIG. 1 or in other non-distributed inventory environments, such as where field inventory databases stand alone. A distributed inventory environment 100 may be employed where a central inventory database 102 tracks a central inventory that supplies field inventories tracked by field inventory databases 106, 108, and 110 as needed. The field inventories are located nearby the field locations where the products are placed in service.

The inventory records of the central inventory database 102 may be reconciled through application of reconciliation processes, such as those shown in FIGS. 6-9, that are implemented in software or hardware by the terminal 104, or by the mainframe server maintaining the database. The terminal and/or mainframe server implementing the processes of FIGS. 6-9 generally have a processing device, such as a general-purpose programmable processor and electronic and/or magnetic storage devices including but not limited to random access memory (RAM), read only memory (ROM), and hard disc drives.

Figure 2:
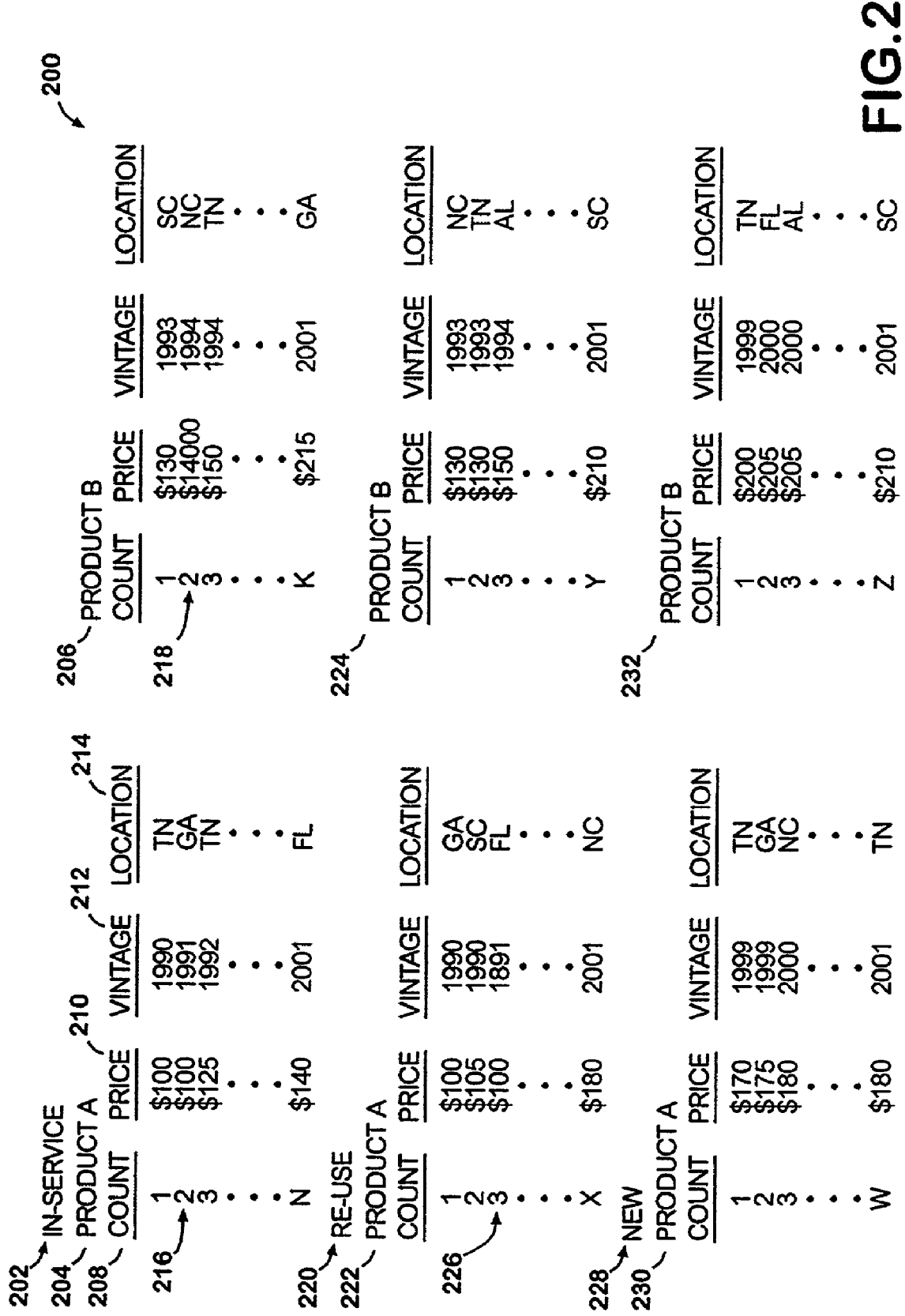
FIG. 2 is an example of a central inventory record having a count, pricing, vintaging, and location assignment for several product types.

FIG. 2 shows one example of a central inventory record 200 maintained by the central database 102, but the present invention is applicable to inventory records of various formats. The central inventory record 200 is divided into different statuses and each status is divided into different product type sections. Products being tracked by the central inventory record 200 that are currently in-service are accounted for in section 202. Product type A of the in-service status 202 is accounted for in a sub-section 204, and Product type B of the in-service status 202 is accounted for in a sub-section 206.

As shown with respect to Product type A sub-section 204, a count 208 is maintained for the product type along with a price 210, a vintage 212, and a location assignment 214. The count 208 has many instances 216 spanning from 1 to N, with N equaling the total number of units of Product A in the in-service inventory according to the inventory record 200. For each instance 216, a value is stored for price 210, vintage 212, and location 214.

Products being tracked by the central inventory record 200 that are currently not in service but have been in the past are classified as re-use and are accounted for in re-use section 220. Re-use section 220 has a Product type A sub-section 222 and a Product type B sub-section 224. The re-use sub-sections 222, 224 also have a count, price, vintage, and location values for each instance of the count. Similarly, products being tracked by the central inventory record 200 that have never been in service are classified as new and are accounted for in new section 228. New section 228 has a Product type A sub-section 230 and a Product type B sub-section 232, with both of these sub-sections 230, 232 also having a count, price, vintage, and location values for each instance of the count.

As mentioned above, when a recount of the actual inventory is done and is compared to the inventory record 200, there may be more instances in the record for a particular status and product type than exists in inventory. In that case, the excess instances in the record to be deleted are chosen based on an assessment of location assignments, as is discussed in more detail below with reference to FIGS. 6-9. If the comparison of the record with the recount shows that there is a shortage in the record 200 because there are more items in inventory than there are instances of the count for a particular status and product type, then instances are added to the count. For each added instance, a price, vintage, and location are assigned, which is also discussed in more detail below with reference to FIGS. 6-9.

The price and vintage to be assigned for a particular product is determined statistically from an existing inventory record, such as the inventory record being reconciled, after outlier values have been removed. Otherwise, the outlier values will skew the statistical determination, such as the computation of average value. Examples of instances with price and/or vintage outliers are shown for the Product B sub-section 206 and Product A sub-section 222. A value is an outlier because it lies beyond a credible range known for the value.

The credible range for price is generally from the least expensive price on record that is known to be valid up to the most expensive price on record that is known to be valid. For example, if an instance of the product has a price on record that is an order of magnitude less than the next least expensive price on record for the product, say $10 versus $100, then it is highly likely that the price for this instance is outside of the credible range. The same principle applies for vintage so that the credible range for vintage is generally from the earliest year on record that is known to be valid up to the latest year on record that is known to be valid. For example, if a product such as an electronic circuit did not exist at the turn of the 20th century, then a vintage of 1900 for the product would be outside of the credible range, as would any vintage beyond the current year.

As shown in FIG. 2, instance 218 of sub-section 206 has a price of $14,000 that is considered an outlier because the credible range of prices for Product B is from $130 to $215. Similarly, instance 226 of sub-section 222 has a vintage of 1891 that is considered an outlier because the credible range of vintages is from 1990 to 2001. It is beneficial to remove these instances with outlier values not only from the reference record prior to determining the representative price and vintage for a product but also from the central inventory record to be reconciled prior to performing the reconciliation process. This allows the reconciliation process to correct the instances with outliers in the record being reconciled.

FIGS. 3-5 will be discussed with reference to the logical operations of FIGS. 6-9. The reconciliation process 600 of FIGS. 6-9 shows one exemplary embodiment of the present invention wherein a new status, re-use status, and in-service status of the central inventory record for each product type are reconciled through substitutions, write-ons, and write-offs. One skilled in the art will recognize that embodiments of the present invention may be adapted in various ways in addition to the example discussed below, such as to apply to inventory records maintaining more or less than three statuses. Furthermore, embodiments of the present invention may be adapted in various ways to address more or less than the three categories of price, vintage, and location, and/or to reconcile the central inventory record without applying substitutions.

Figure 6:
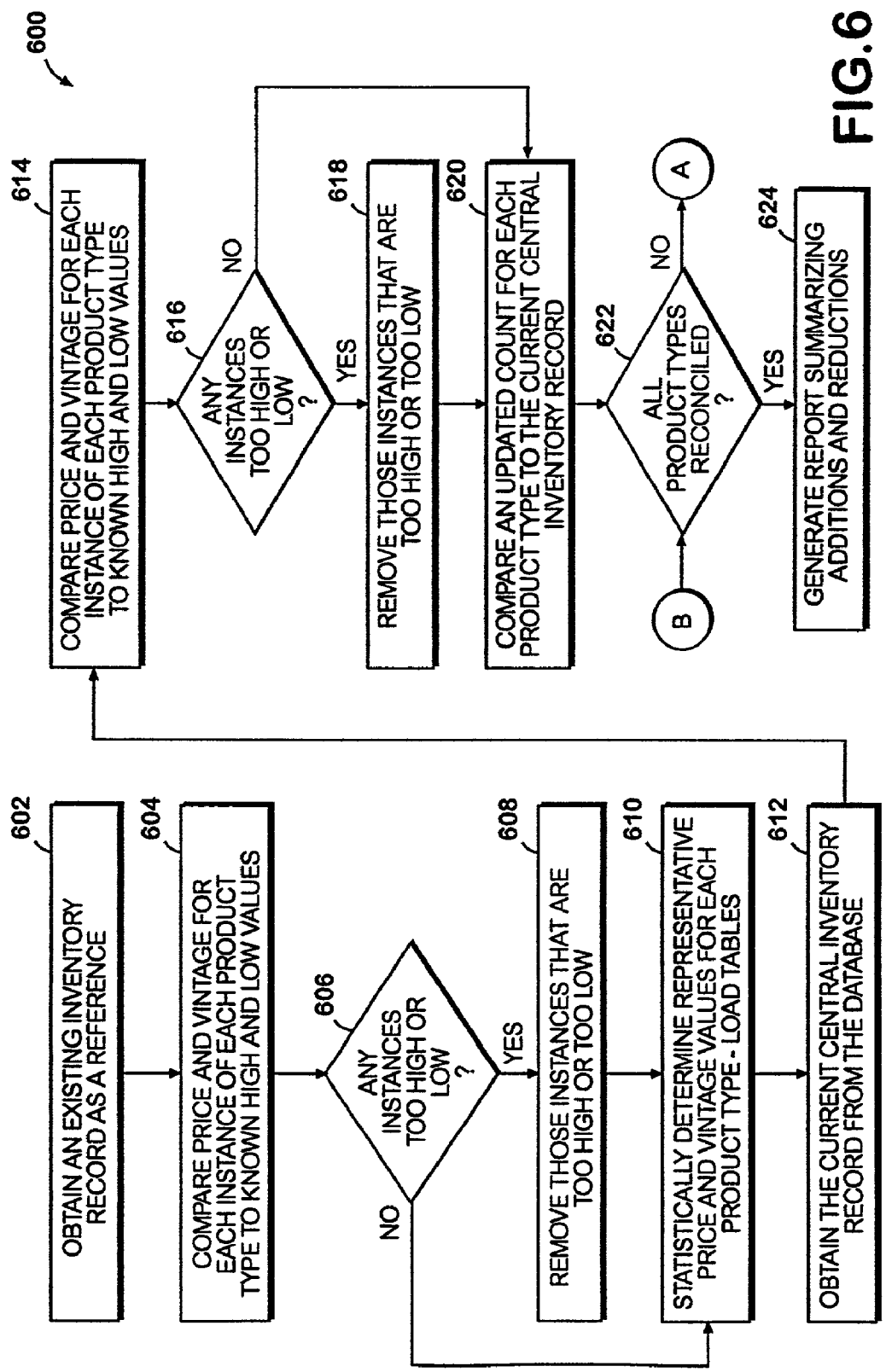
FIG. 6 shows a first portion of an exemplary operational flow of one embodiment of the present invention wherein the current central inventory is compared to the updated count.
Figure 7:
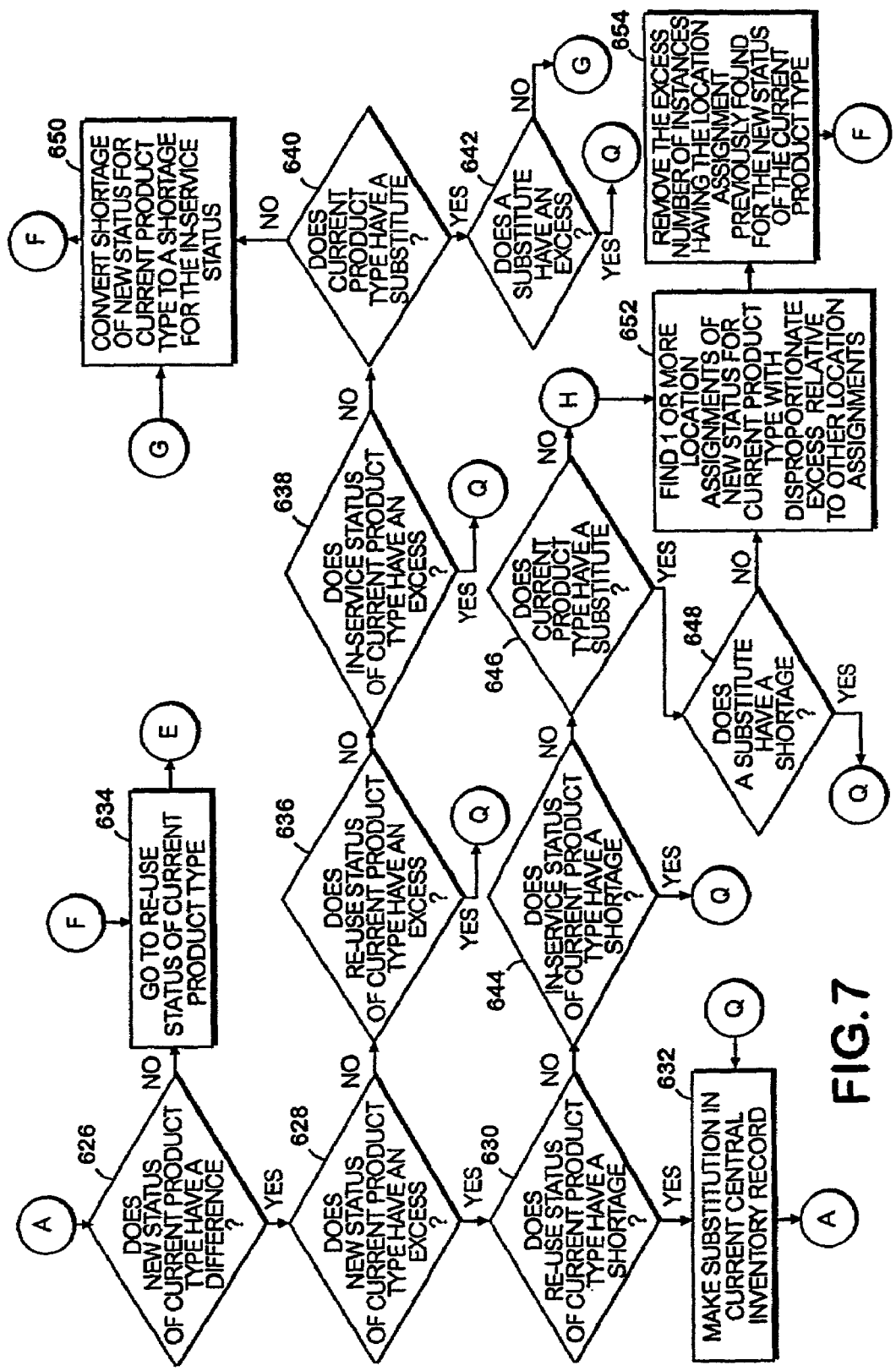
FIG. 7 shows a second portion of the exemplary embodiment of FIG. 6 wherein a new status for each product type of the current central inventory record is reconciled.

The reconciliation process begins at reference operation 602 of FIG. 6 where an existing inventory record is obtained, such as from the central inventory database, to act as a reference for generating representative price and vintage values. The existing inventory record may be the current central inventory record being reconciled or an archived central inventory record. At compare operation 604, the price and vintage of each instance of the count for each product type in the reference inventory record is compared to known high and low values defining the credible ranges. Query operation 606 then detects whether any instances are too high or too low to find all outlier values. If instances are too high or too low, then remove operation 608 deletes those instances with outliers from the inventory record.

After outlier values have been removed from the reference, table operation 610 statistically determines the representative price and vintage values for each product type. The statistical determination may be an average value, a median value, or other similar computation of a value that falls near the center of the credible range. The price and vintage for each product may then be loaded into tables that are later referenced when adding instances to the current central inventory record being reconciled. FIG. 3 shows an example of a price and vintage table 300 which lists the product type 302 as well as the representative price 304 and the representative vintage 306 that have been statistically determined. The storage devices of the terminals and/or mainframe of the inventory system may maintain the price and vintage tables. In the example shown, Product Type A has a representative price of $142 and a representative vintage of 1995.

Database operation 612 then obtains the current central inventory record to be reconciled from the appropriate database. Compare operation 614 then compares the price and vintage for each instance of the count for each product type in the central inventory record to the known high and low values of the credible ranges. Query operation 616 detects whether any instances have a price or vintage that is too high or too low. If the current central inventory record was used as the reference record, then all outliers should have been previously removed and operational flow transitions to compare operation 620. If the current central inventory record was not used as the reference record, then query operation 616 may detect some instances having outlier values. If so, then remove operation 618 deletes those instances from the current central inventory record. Those instances being removed will be accounted for later through the write-on process and will be assigned a representative price and vintage from the tables that are generally more accurate than the outlier values previously assigned.

Compare operation 620 then compares an updated count for each product type in inventory to the count of each product type in the current central inventory record. The updated count is a raw number of the items that actually exist in inventory and is produced by a manual recounting of those items. A count and an updated count may be compared for each status of each product type if statuses are maintained in the inventory record. As discussed above in relation to FIG. 2 and below in relation to FIGS. 7-9, one example is where a new status, a re-use status, and an in-service status are maintained for each product type. Query operation 622 then detects whether all product types in inventory have been reconciled. On the first pass and possibly subsequent passes depending upon the number of product types in inventory, query operation 622 will detect that not all product types have been reconciled so operational flow transitions to query operation 626 of FIG. 7.

Query operation 626 detects whether the new product status for the current product type has a difference relative to the updated count for the new status. If no difference exists, then the count of the current central inventory record in the new status section for the current product type is correct and product operation 634 shifts focus of the current inventory record to the re-use status for the current product type. Operational flow then transitions to query operation 656 of FIG. 8. If a difference is detected by query operation 626, then query operation 628 detects whether the new status for the current product type has an excess number of instances in the central inventory record. If not, then operational flow transitions to query operation 636 which detects whether the re-use status for the current product type has an excess number of instances in the central inventory record. If the new status does have an excess number of instances, then operational flow transitions to query operation 630 which detects whether the re-use status for the current product type has a shortage of instances.

If query operation 636 detects that the re-use status has an excess number of instances, then operational flow transitions to substitution operation 632. Substitution operation 632 then makes the substitution of the excess instances of the re-use status for the shortage of instances of the new status in the current central inventory record until the excess of the re-use status is depleted or the shortage of the new status is eliminated. The price, vintage, and location assignment carry over for the instances being substituted. Operational flow then returns to query operation 626.

If query operation 630 detects that the re-use status has a shortage of instances, then operational flow also transitions to substitution operation 632. Substitution operation 632 again makes a substitution, but the excess instances of the new status are substituted for the shortage of instances of the re-use status. The substitutions occur until the excess of the new status is depleted or the shortage of the re-use status is eliminated. Again, the price, vintage, and location assignment carries over for each instance being substituted. Operational flow then returns to query operation 626.

If and when operation flow transitions to query operation 638 from query operation 636, it is detected whether the in-service status of the current product type has an excess number of instances in the central inventory record. If so, then operational flow transitions to substitution operation 632 where substitutions are made until the shortage of the new status is eliminated or the excess of the in-service status is depleted. Operational flow then transitions back to query operation 626. However, if query operation 638 detects that the in-service status has no excess, then query operation 640 detects whether a substitute is available for the current product type being reconciled.

A substitution table such as the one shown in FIG. 4 may be referenced to determine whether a substitute for the current product type is available. A substitute is a product that can be interchanged with another when in service and will function properly. The storage device of the terminal and/or mainframe of the inventory system may also maintain the substitution table.

As shown in FIG. 4, a list of product types 402 is provided along with a list of substitutions 404 in the substitution table 400. In the example shown, Product A is interchangeable with Product B and Product D. Similarly, Product B is interchangeable with Product A and Product D. If query operation 640 finds that a substitution is available, then query operation 642 detects from the previous comparison whether any status for the substitute has an excess number of instances in the central inventory record relative to the updated count. If the current central inventory record does have an excess for the substitute, then substitution operation 632 substitutes the excess instances of the substitute for the shortage of instances for the new status until the shortage is eliminated or the excess is depleted. Then, operational flow returns to query operation 626. If query operation 642 finds no excess for the substitute, then convert operation 650 converts the shortage of the new status for the current product type to a shortage for the in-service status of the current product type which can be reconciled by the operations of FIG. 9. Operational flow then transitions to product operation 634.

If and when operational flow transitions to query operation 644 from query operation 630, it is detected whether the in-service status of the current product type has a shortage. If so, then operational flow transitions to substitution operation 632 where the excess of the new status is substituted for the shortage of the in-service status until the excess is depleted or the shortage is eliminated. Then, operational flow transitions back to query operation 626. If query operation 644 detects that the in-service status does not have a shortage, then query operation 646 detects whether the current product type has a substitute. If so, then query operation 648 detects whether any status for the substitute has a shortage of instances in the central inventory record. If so, then substitution operation 632 substitutes the excess of the new status for the shortage of the substitute until the excess is depleted or the shortage is eliminated, and operational flow returns to query operation 626. If the substitute does not have a shortage, or no substitute exists for the current product type, then operational flow transitions to location operation 652.

Location operation 652 finds one or more location assignments for the instances of the new status for the current product type with a disproportionate excess relative to other location assignments. For example, it may be desirable to equalize the number of instances for each location assignment. In that case, if one or more location assignments are present in the new status at a higher percentage than others, then location operation 652 finds those location assignments with a disproportionate amount as indicated by the higher percentage. In another example, it may be desirable to maintain a certain percentage of instances for each location type rather than equalize them. In this case, the existing percentage for each location assignment may be compared against its ideal percentage to determine whether it has a disproportionate excess.

Remove operation 654 then removes or writes-off the excess number of instances of the new status having the location assignment(s) found in the previous operation. In the example where instances are to be equalized, if two location assignments are disproportionate relative to others, then a number of the excess instances are removed from each of the location assignments to equalize them with the other location assignments. If an excess still exists, then an equal number of instances are removed for each location assignment. In the example where instances have their own ideal percentages, a number of the excess instances are removed from the new status for each location assignment having a percentage greater than the ideal. Operational flow then transitions to product operation 634.

Figure 8:
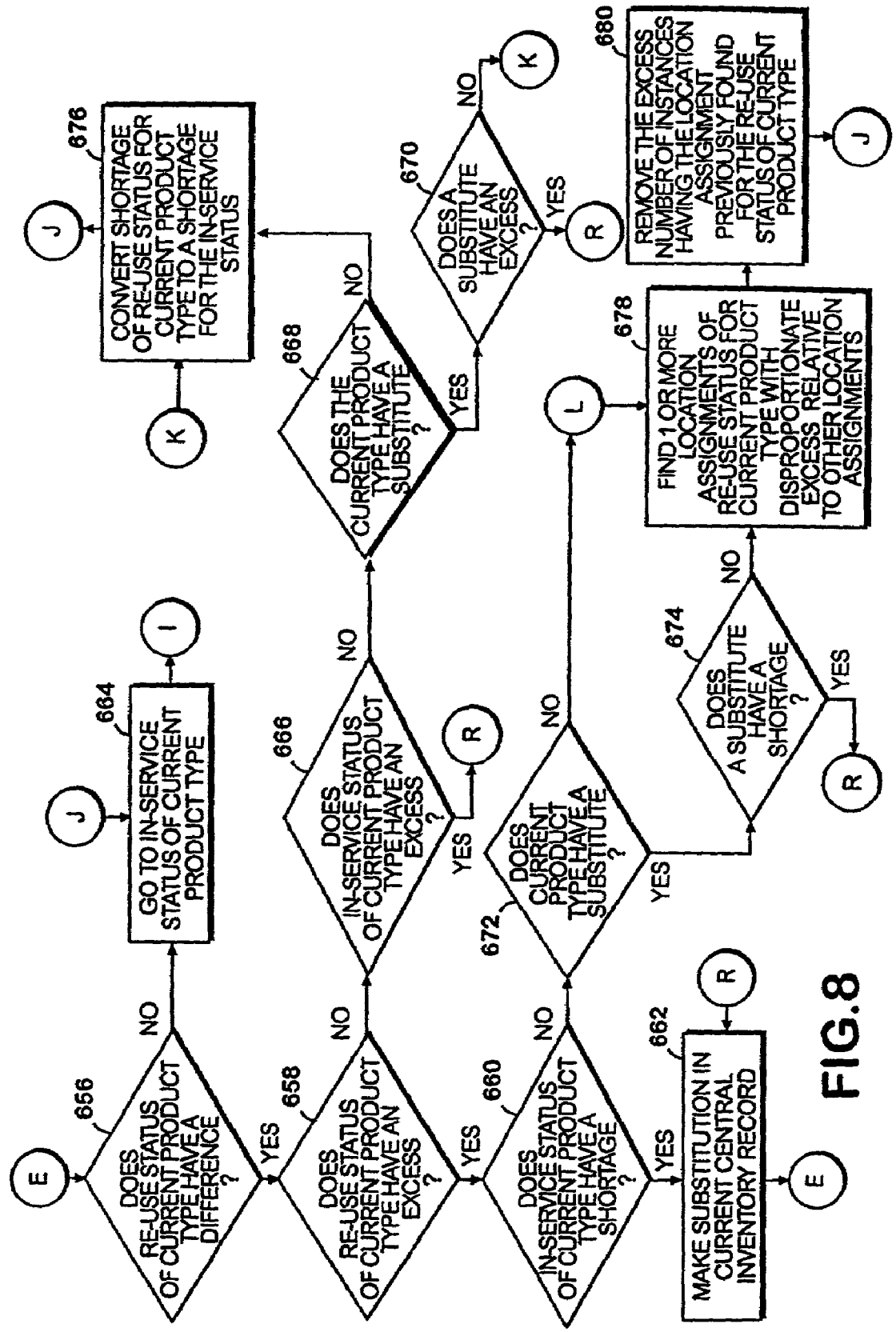
FIG. 8 shows a third portion of the exemplary embodiment of FIG. 6 wherein a re-use status for each product type of the current central inventory record is reconciled.

Query operation 656 of FIG. 8 detects whether the re-use product status for the current product type has a difference relative to the updated count for the re-use status. If no difference exists, then the count of the current central inventory record in the re-use status section for the current product type is correct and product operation 664 shifts focus of the current inventory record to the re-use status for the current product type. Operational flow then transitions to query operation 682 of FIG. 9. If a difference is detected by query operation 656, then query operation 658 detects whether the re-use status for the current product type has an excess number of instances in the central inventory record. If not, then operational flow transitions to query operation 666 which detects whether the in-service status for the current product type has an excess number of instances in the central inventory record. If the re-use status does have an excess number of instances, then operational flow transitions to query operation 660 which detects whether the in-service status for the current product type has a shortage of instances.

If query operation 666 detects that the in-service status has an excess number of instances, then operational flow transitions to substitution operation 662. Substitution operation 662 then makes the substitution of the excess instances of the in-service status for the shortage of instances of the re-use status in the current central inventory record until the excess of the in-service status is depleted or the shortage of the re-use status is eliminated. The price, vintage, and location assignment carry over for the instances being substituted. Operational flow then returns to query operation 656.

If query operation 660 detects that the re-use status has a shortage of instances, then operational flow also transitions to substitution operation 662. Substitution operation 662 again makes a substitution, however the excess instances of the re-use status are substituted for the shortage of instances of the in-service status. The substitutions occur until the excess of the re-use status is depleted or the shortage of the in-service status is eliminated. Again, the price, vintage, and location assignment carries over for each instance being substituted. Operational flow then returns to query operation 656.

If and when operational flow transitions to query operation 668 from query operation 666, it is detected whether a substitute is available for the current product type being reconciled. If query operation 668 finds that a substitution is available, then query operation 670 detects from the previous comparison whether any status for the substitute has an excess number of instances in the central inventory record relative to the updated count. If the current central inventory record does have an excess for the substitute, then substitution operation 662 substitutes the excess instances of the substitute for the shortage of instances for the re-use status until the shortage is eliminated or the excess is depleted. Then, operational flow returns to query operation 656. If query operation 670 finds no excess for the substitute, then convert operation 676 converts the shortage of the re-use status for the current product type to a shortage for the in-service status of the current product type which can be reconciled by the operations of FIG. 9. Operational flow then transitions to product operation 664.

If and when operational flow transitions to query operation 672 from query operation 660, it is detected whether the current product type has a substitute. If so, then query operation 674 detects whether any status for the substitute has a shortage of instances in the central inventory record. If so, then substitution operation 662 substitutes the excess of the re-use status for the shortage of the substitute until the excess is depleted or the shortage is eliminated, and operational flow returns to query operation 656. If the substitute does not have a shortage, or no substitute exists for the current product type, then operational flow transitions to location operation 678.

Location operation 678 finds one or more location assignments for the instances of the re-use status for the current product type with a disproportionate excess relative to other location assignments. As discussed above, it may be desirable to equalize the number of instances for each location assignment. In that case, if one or more location assignments are present in the re-use status at a higher percentage than others, then location operation 678 finds those location assignments with a disproportionate amount as indicated by the higher percentage. In another example, it may be desirable to maintain a certain percentage of instances for each location type rather than equalize them. In this case, the existing percentage for each location assignment may be compared against its ideal percentage to determine whether it has a disproportionate excess.

Remove operation 680 then removes the excess number of instances from the re-use status having the location assignment(s) found in the previous operation. In the example where instances are to be equalized, if two location assignments are disproportionate relative to others, then a number of the excess instances for each of the location assignments are removed from the re-use status to equalize them with the other location assignments. If an excess still exists for the re-use status, then an equal number of instances are removed for each location assignment. In the example where instances have their own ideal percentages, a number of the excess instances are removed from each location assignment having a percentage greater than the ideal. Operational flow then transitions to product operation 664.

Figure 9:
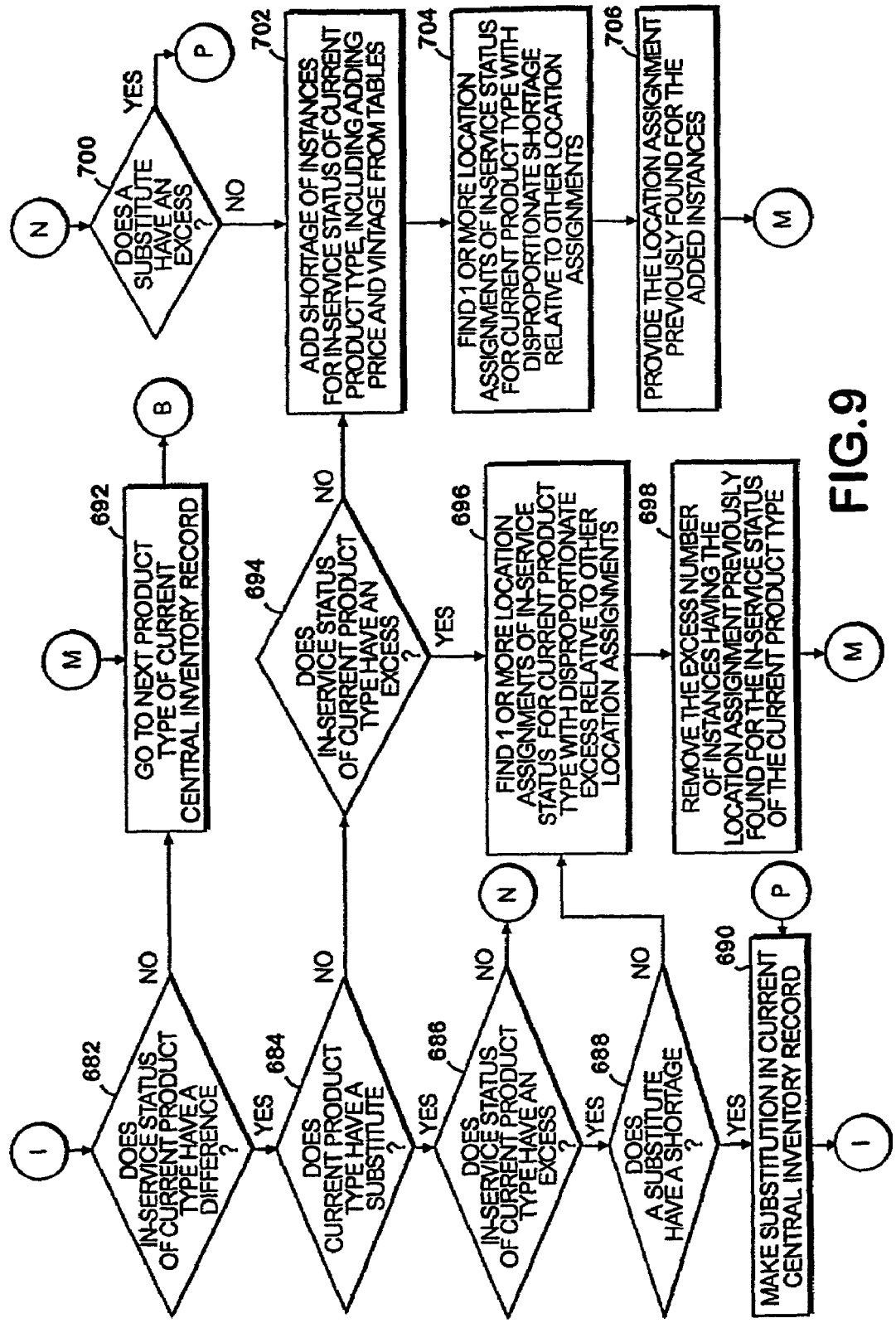
FIG. 9 shows a fourth portion of the exemplary embodiment of FIG. 6 wherein an in-service status for each product type of the current central inventory record is reconciled.

Query operation 682 of FIG. 9 detects whether the in-service product status for the current product type has a difference relative to the updated count for the in-service status. If no difference exists, then the count of the current central inventory record in the in-service status section for the current product type is correct and product operation 692 shifts focus of the current inventory record to the next product type. Operational flow then transitions to query operation 622 of FIG. 6. If a difference is detected by query operation 682, then query operation 684 detects whether the current product type has a substitute. If no substitution is available, then query operation 694 detects whether the in-service status of the current product type has an excess in the central inventory record. If query operation 684 finds that a substitution is available, then query operation 686 detects whether the in-service status has an excess of instances in the central inventory record.

If there is an excess for the in-service status as detected by query operation 686, then query operation 688 detects whether an status for the substitute has a shortage of instances in the central inventory record. If so, then substitution operation 690 substitutes the excess of the in-service status for the shortage of the substitute until the excess is depleted or the shortage is eliminated, and operational flow returns to query operation 682. If the substitute does not have a shortage as detected by query operation 688, then operational flow transitions to location operation 696.

If and when operational flow transitions to query operation 694 from query operation 684, it is detected whether the in-service status has an excess of instances in the central inventory record. If there is an excess for the in-service status, then operational flow transitions to location operation 696. Location operation 696 finds one or more location assignments for the instances of the in-service status for the current product type with a disproportionate excess relative to other location assignments. As discussed above, it may be desirable to equalize the number of instances for each location assignment. In that case, if one or more location assignments are present in the in-service status at a higher percentage than others, then location operation 696 finds those location assignments with a disproportionate amount as indicated by the higher percentage. In another example, it may be desirable to maintain a certain percentage of instances for each location type rather than equalize them. In this case, the existing percentage for each location assignment may be compared against its ideal percentage to determine whether it has a disproportionate excess.

Remove operation 698 then removes the excess number of instances from the in-service status having the location assignment(s) found in the previous operation. In the example where instances are to be equalized, if two location assignments are disproportionate relative to others, then a number of the excess instances for each of the location assignments are removed from the in-service status to equalize them with the other location assignments. If an excess still exists for the in-service status, then an equal number of instances are removed for each location assignment. In the example where instances have their own ideal percentages, a number of the excess instances are removed from each location assignment having a percentage greater than the ideal. Operational flow then transitions to product operation 692.

If and when query operation 686 detects that the in-service status does not have an excess, then query operation 700 detects whether any status of a substitute has an excess. If so, then substitution operation 690 substitutes the excess instances of the substitute for the shortage of instances for the in-service status until the shortage is eliminated or the excess is depleted. Then, operational flow returns to query operation 682.

If query operation 700 detects that a substitute has no excess or query operation 694 detects that the in-service status has no excess, then instance operation 702 adds or writes-on instances to the central inventory record for the in-service status of the current product type, including adding a representative price and vintage for the written-on instances by referencing the tables of FIG. 3. In the exemplary embodiment, all write-ons have been directed to the in-service status because legal restrictions may be applicable which prevent write-ons to occur to the new or re-use status. One skilled in the art will recognize that the embodiments may be adapted to situations where write-ons can occur for the new status and/or re-use status as well.

After the instances have been written-on to the in-service status for the current product type and the price and vintage have been assigned, operational flow transitions to location operation 704. Location operation 704 finds one or more location assignments for the instances of the in-service status for the current product type with a disproportionate shortage relative to other location assignments. As discussed above, it may be desirable to equalize the number of instances for each location assignment. In that case, if one or more location assignments are present in the in-service status at a lower percentage than others, then location operation 704 finds those location assignments with a disproportionate amount as indicated by the lower percentage. In another example, it may be desirable to maintain a certain percentage of instances for each location type rather than equalize them. In this case, the existing percentage for each location assignment may be compared against its ideal percentage to determine whether it has a disproportionate shortage.

Record operation 698 then assigns the location assignment(s) found in the previous operation to the instances that have been written-on to the central inventory record. In the example where instances are to be equalized, if two location assignments are disproportionate relative to others, then a number of the instances written-on are assigned either of these location assignments to equalize them with the other location assignments. If written-on instances without location assignments still exist for the in-service status once the location assignments have been equalized, then each location assignment is equally assigned across these remaining write-ons. In the example where instances have their own ideal percentages, a number of the written-on instances are assigned a location assignment having a percentage less than the ideal until the ideal is reached. Operational flow then transitions to product operation 692.

Once query operation 622 of FIG. 6 has detected that all product types have been reconciled, then report operation 624 generates a report that summarizes the additions and reductions to the central inventory record. An example report 500 is shown in FIG. 5 and contains a product type listing 502 for the in-service status, listing 504 for the re-use status, and listing 506 for the new status. The corresponding listing of reductions 504, 508, and 510 as well as the listing of additions 506 are included in the report. As shown in the example, the reconciliation process has resulted in two reductions or write-offs to the in-service status of the current inventory record for Product type A and three additions or write-ons to the in-service status of the current inventory record for Product type B. As previously discussed, the embodiment of the reconciliation process discussed herein assumed a restriction that write-ons cannot occur for the re-use and new status, and accordingly, no additions are reported for these statuses in report 500. However, other variations to the embodiments are possible where additions to the new and re-use statuses may occur and may be reported. The report 500 may include additional information as well such as the total amount written-on, the total amount written-off, and the net change in total price for the current inventory record due to the write-ons and write-offs.

The price and vintage tables such as the table shown in FIG. 3 may be created once, and then reused for multiple inventory reconciliation events. The tables may be updated or recreated whenever a change in the price and/or vintage occurs for the new items being added to the inventory. Furthermore, additional tasks may be conducted during the reconciliation process, such as reconciling the investment record for the items in inventory in addition to reconciling the inventory record. Reconciling the investment record involves keeping track of payment or non-payment relative to the physical movement of an item into or out of inventory due to buying or selling of that particular item.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of reconciling a current central inventory record having existing counts, pricing, vintage, and location assignments for a plurality of product types, comprising:

obtaining by means of a processing device the current central inventory record maintained by the processing device;

recounting a central inventory to produce an updated count for each product type;

removing, from the existing inventory record having counts, pricing, and vintaging for the plurality of product types, each instance of each count where price or vintage is an outlier value beyond a credible range from the least known valid value to the greatest known valid value;

statistically determining a representative price and vintage for each of the plurality of product types from the existing inventory record after the instances of each count with outlier values have been removed, and wherein assigning a price and vintage comprises assigning the representative price and vintage that falls near the center of the credible range for the product type;

comparing each count of the current central inventory record to each updated count to obtain a difference in count for each product type;

when the difference for a particular product type indicates that a number of instances for the product type for the particular location assignment of the current central inventory record is greater than the number of instances for a different location assignment, reducing the count of the current central inventory record maintained by the processing device for the particular product type by the difference by detecting excessive instances of the count for the product type for the particular location assignment and removing enough instances from the count for the product type having the particular location assignment to equalize the number of instances with the number of instances at the different location assignment;

when the difference for the particular product type indicates a shortage in the count of the current central inventory record, adding the difference to the count of the current central inventory record maintained by the processing device for the particular product type and providing a location assignment to each instance added to the count by detecting a shortage of instances of the count for the product type for the particular location assignment relative to a proportionate amount and providing the particular location assignment to one or more of the added instances, and assigning to each added instance the representative price and vintage determined for the product type;

wherein the current central inventory record has counts for each product type divided into a new status, a re-use status, and an in-service status, and wherein the step of recounting a central inventory to produce an updated count for each product type comprises recounting the central inventory to produce an updated count for the new status, the re-use status, and the in-service status, and wherein comparing each count of the current central inventory record to each updated count comprises comparing the count for the new status to the updated count for the new status, comparing the count for the re-use status to the updated count for the re-use status, and comparing the count for the in-service status to the updated count for the in-service status to produce a difference for each status and for each product type;

wherein comparing each count of the current central inventory record to each updated count further comprises:

detecting whether an excess or shortage exists for each status of the current central inventory record for a product type;

when an excess exists for the new status for the product type, reducing the count of the new status for the product type by the excess;

when a shortage exists for the new status for the product type, converting the shortage of the new status for the product type to a shortage for the in-service status for the product type;

when an excess exists for the re-use status for the product type, reducing the count of the reuse status for the product type by the excess;

when a shortage exists for the re-use status for the product type, and an excess of instances of in service status exists for the product type, substituting the excess of instances of in-service status for the shortage of instances of the re-use status in the current central inventory record until the excess of the in-service status in depleted or the shortage of the re-use status is eliminated;

when an excess exists for the in-service status for the product type, reducing the count for the in-service status for the product type by the excess; and when a shortage exists for the in-service status for the product type including any shortage converted from the new or re-use status for the product type, adding instances equal to the shortage to the in-service status for the product type with one or more of the instances being provided the particular location assignment.

2. The method of claim 1, wherein statistically determining a representative price and vintage comprises computing an average price and vintage from the existing inventory record.

3. The method of claim 1, wherein a first and second product type of the plurality of product types are interchangeable, the method further comprising when there is an excess of the first product type in the current central inventory record relative to the updated count and a shortage of the second product type in the current central inventory record relative to the updated count, substituting the excess of the first product type in place of the shortage of the second product type in the current inventory record.

4. The method of claim 3, further comprising:

referencing a substitution table to determine that the first product type and the second product type are interchangeable.

5. The method of claim 1, wherein assigning the previously determined representative price and vintage for each instance added to the count comprises referencing a price table and a vintage table to determine the representative price and vintage to be assigned.

6. The method of claim 1, further comprising producing a report showing the reductions and additions to the count of the current central inventory record.

7. The method of claim 1, wherein reducing the count of the current central inventory record comprises deleting a number of instances of the count for the product type that have the particular location assignment and have an earliest vintage.

* * * * *